(12) United States Patent
Peebles et al.

(10) Patent No.: US 7,471,882 B2
(45) Date of Patent: Dec. 30, 2008

(54) HEATED REGULATOR WITH REMOVABLE HEAT INDUCER AND FLUID HEATER AND METHODS OF USE

(75) Inventors: Tracy Dean Peebles, Houston, TX (US); Thomas S. Green, Sugar Land, TX (US)

(73) Assignee: Welker, Inc., Sugar Land, TX (US)

( * ) Notice: Subject to any disclaimer, the term of this patent is extended or adjusted under 35 U.S.C. 154(b) by 307 days.

(21) Appl. No.: 11/162,626

(22) Filed: Sep. 16, 2005

(65) Prior Publication Data
US 2005/0274171 A1 Dec. 15, 2005

(51) Int. Cl.
*H05B 3/60* (2006.01)
(52) U.S. Cl. .................................. 392/311; 392/465
(58) Field of Classification Search .................. 392/311
See application file for complete search history.

(56) References Cited

U.S. PATENT DOCUMENTS

| | | | | |
|---|---|---|---|---|
| 2,775,683 | A | * 12/1956 | Kleist | .................. 392/398 |
| 3,653,339 | A |   4/1972 | Steele | |
| 3,835,294 | A | * 9/1974 | Krohn et al. | ............... 392/484 |
| 4,346,611 | A |   8/1982 | Welker | |
| 4,387,592 | A |   6/1983 | Welker | |
| 4,458,655 | A | * 7/1984 | Oza | .................... 123/558 |
| 4,465,922 | A | * 8/1984 | Kolibas | .................. 392/484 |
| 4,594,904 | A |   6/1986 | Richter | |
| 4,631,967 | A | 12/1986 | Welker | |
| 5,224,510 | A |   7/1993 | Pericles | |
| 5,265,318 | A | * 11/1993 | Shero | ......................... 29/447 |
| 5,520,211 | A |   5/1996 | Schonstein et al. | |
| 5,747,102 | A | * 5/1998 | Smith et al. | ............... 427/98.4 |
| 5,907,107 | A |   5/1999 | Welker | |
| 6,546,921 | B1 | * 4/2003 | Callahan | ................. 123/573 |
| 6,804,459 | B2 | * 10/2004 | Raghavan et al. | ........... 392/484 |
| 7,248,792 | B2 | * 7/2007 | Mihara | .................... 392/492 |
| 7,286,752 | B2 | * 10/2007 | Gourand | ................... 392/479 |
| 2007/0235086 | A1 | * 10/2007 | Hornby et al. | .............. 137/334 |

* cited by examiner

*Primary Examiner*—Thor S Campbell
(74) *Attorney, Agent, or Firm*—Husch Blackwell Sanders LLP

(57) ABSTRACT

A removable heat inducer may be used in either a heated regulator or a fluid heater. The removable heat inducer has various embodiments. In one embodiment, helical threads are formed on the outside surface of the inducer. The inducer expands when heated causing the crest of the threads to come into contact with the inside surface of a heating chamber to form a spiral fluid passageway which promotes better heat exchange between the fluid and the heating element. In a first alternative embodiment of the inducer, a series of walled partitions and slots are formed on the outside surface of the inducer, which likewise expand and contact the inside surface of the heating chamber to form a dead head flow passageway. Again, the purpose of the passageway is to promote efficient heat exchange. In a second alternative embodiment of the removable heat inducer, a plurality of rods are placed in the heating chamber to promote heat exchange. The spaces between the rods form passageways for the fluid. The removable heat inducer may be used in a heated regulator or a fluid heater.

5 Claims, 4 Drawing Sheets

Fig. 1
Fig. 2
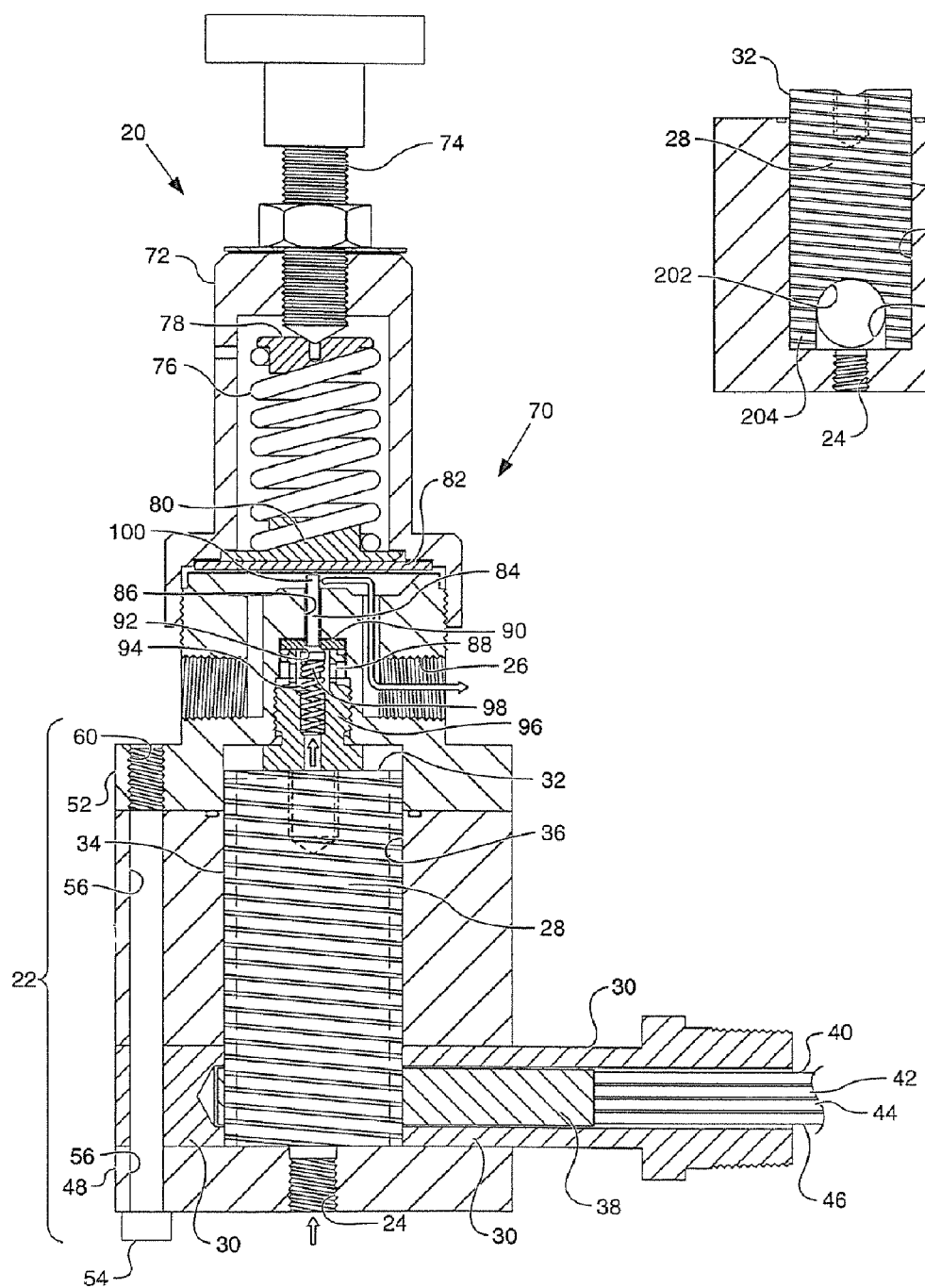
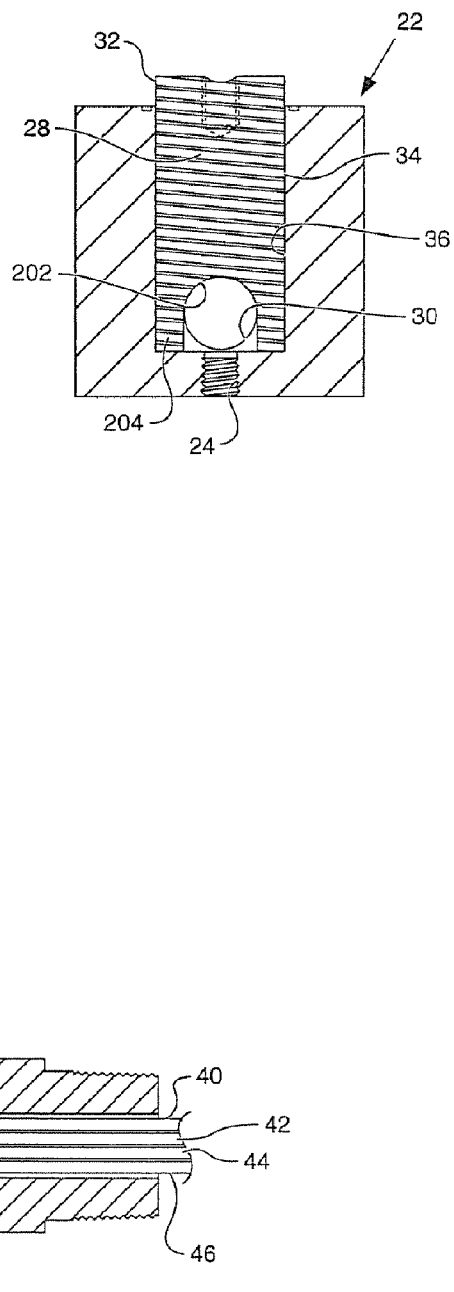

HEATED REGULATOR WITH REMOVABLE HEAT INDUCER AND FLUID HEATER AND METHODS OF USE

BACKGROUND OF THE INVENTION

It is often desirable in the natural gas, petrochemical and oil industries to withdraw samples directly from pipelines, vessels or process for analysis or measurement of the fluid. Various instruments are used for this purpose, such as calorimeters, gravitometers, and hydrogen sulfide analyzers. The pipeline can be taped and a sample drawn directly therefrom, however the pressure of the fluid in a pipeline is often too high for use in analyzing or measuring instruments. Pipelines carry natural gas at pressures as great as 5,000 pisg, while many gas analyzing instruments cannot use samples at greater than 100 psig. Regulators are used to step down pipeline pressures to instrument pressures. This reduction in pressure may also cause a drop in temperature due to the Joule-Thomson effect which can also cause condensation of gases. Condensation is undesirable for gas entering instrumentation systems.

Therefore, many regulators are heated to counter the Joule-Thomson effect and reduce the condensation of gas. For example, Welker Engineering Company, of Sugar Land, Tex., the assignee of the present application has sold a heated regulator described on a brochure included in the Information Disclosure Statement filed herewith and is the owner of U.S. Pat. No. 5,907,107, for a Heated Instrument Regulator Tip. Other companies, such as GO Regulator of Spartanburg, S.C. sell a variety of electrically heated and steam heated regulators, brochures of which are likewise included in the Information Disclosure Statement filed herewith. Some of the GO regulators have a spiral wrapped screen as the heat exchange surface. The problem with many of these prior art heated regulators is that they do a poor job of actually heating the gas. There is a need for improved heat exchange in regulators and other devices to prevent condensation of gases prior to entering instrumentation systems.

SUMMARY OF THE INVENTION

The heated regulator has a body that defines a heating chamber sized and arranged to receive a removable heat inducer. A heat tube penetrates at least a portion of the heating chamber and contains an electrical heating element. When electrical current flows through the heating element, it heats up which warms the heat tube and the heat inducer. A fluid contacts the heat inducer and flows through the heating chamber to raise the temperature of the fluid. The heated regulator may be used to prevent condensation of gases prior to entering instrumentation systems. The heated regulator can also be used to heat fluids and to vaporize liquids prior to gas analysis. The removable heat inducer can have various shapes and designs. On one embodiment, there are threads formed on the outside surface, which when heated expand and engage the inside wall of the heating chamber to define a spiral passageway for the fluid. Another embodiment has projections which when heated expand and engage the inside wall of the heating chamber to define a dead-head passageway for the fluid. In another embodiment, the removable heat inducer can consist of a plurality of rods, at least a portion of which are in contact with the heat tube. The purpose of the removable heat inducer is to raise the temperature of the fluid and many different shapes and configurations are suitable for this task. In some situations, a regulator is not needed. In these situations, the heating chamber, heat tube, heating element and heat inducer form a heater without the regulator mechanism. The fluid heater relies on the same warming function as the heated regulator: the heating element heats the heat tube and the heat inducer which heats the fluid.

BRIEF SUMMARY OF THE DRAWINGS

FIG. 1 is a section view of the heated regulator.

FIG. 2 is a partial section view of the removable heat inducer and heating chamber of FIG. 1 rotated 90°.

FIG. 9 shows the heat inducer of FIGS. 3 and 4.

DETAILED DESCRIPTION OF THE INVENTION

Figure 3:
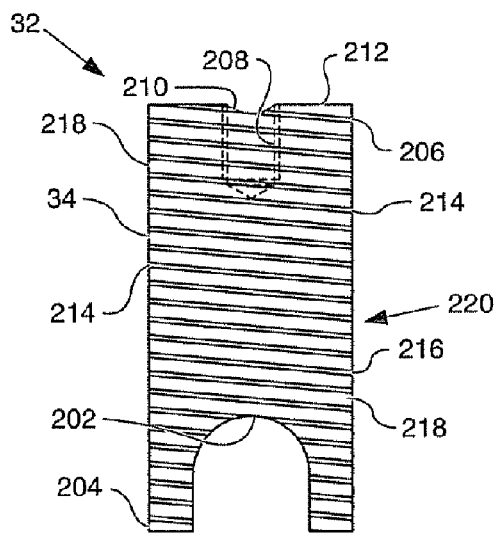
FIG. 3 is an enlarged side view of the removable heat inducer of FIG. 2.

FIG. 1 is a section view of the heated regulator generally identified by the numeral 20. The regulator body 22 defines an inlet 24 and an outlet 26, which may also be referred to as the regulated pressure outlet. The body 22 defines a heating chamber 28. The removable heat inducer 32 is sized and arranged to fit inside the heating chamber with enough clearance to allow easy insertion and removal. However, the clearance should also be small enough so portions of the outside surface 34 of the heat inducer will contact the inside surface 36 of the heating chamber when both are heating to operating temperatures. Applicant has found that a clearance of about 0.005 to about 0.010 inches is suitable for this apparatus using an aluminum removable heat inducer 32.

The heating element 38 is connected to multiple conductors 40, 42, 44 and 46. The conductors connect to a source of electrical power, not shown and control instrumentation, not shown. In one embodiment a 150 watt heating element has been found suitable for gas service. The heating element is powered by 110 AC current and draws about 144 Ohms and 1.25 Amps, nominally. This 150 watt heating element can be purchased form Modular Technology, Inc. of Brea, Calif. Applicants have found that it is useful to connect the heating element to a thermostat, not shown, model number EHAMT 001 from Modular Technology, Inc. The temperature range of control is from 68° to 210° F. In one embodiment, the inlet pressure is 1000 lbs. and the regulated pressure is 15 lbs. The apparatus flows an average of about 50 cubic centimeters of gas per minute. In order to properly set the thermostat, the operator must first calculate the hydrocarbon dewpoint of the fluid. The thermostat may be set from about 30° to about 50° F. above the calculated dewpoint. See API 14.1 and GPA-2166.

The body 22 includes a lower segment 48 and an upper segment 52. A plurality of bolts, one of which is shown in this view secure the three body segments together. Bolt 54 passes through an aperture 56 in the lower segment and threadably engages a threaded receptacle 60 in the upper segment 52. The bolt, and others not shown, holds the two body segments together.

The adjustable regulator mechanism 70 is well known to those skilled in the art. The regulator is adjusted to a set point pressure and it regulates the higher upstream pressure to the set point pressure in the outlet or regulated pressure side of the device. The adjustable regulator mechanism 70 is described herein merely for those unfamiliar with the apparatus.

The adjustable regulator includes a bonnet 72 that threadably engages the upper segment of the body 52. An adjustment screw 74 threads through the bonnet and engages an upper spring follower 78 which presses against the adjustment spring 76. The lower part of the adjustment spring engages a lower spring follower 80. A disk 82 is captured between the lower spring follower and the elongate poppet valve 84. The disk 82 imparts movement to the elongate poppet valve which will be discussed below in greater detail below. The elongate poppet valve 84 passes through an aperture 86 in the upper body segment 52 and passes into the regulator chamber 88. A seal 90 is captured in the regulator chamber between the upper body segment and the poppet spring retainer 96. A portion of the elongate poppet valve 84 is formed into a poppet valve seat 92 which engages the seal 90. A poppet spring 94 is held in the poppet spring retainer 96 and engages one end 98 of the poppet valve 84. The upper end 100 of the poppet valve 84 engages the disk 82. In normal operation, the poppet valve seat 92 engages and seals against the seal 90 most of the time, preventing high pressure fluid from passing unregulated from the inlet 24 through the heated regulator to the outlet 26 or regulated side of the device.

However, when the pressure in the regulated side 26 falls below the set point, the spring pressure in the adjustment spring overcomes the force being applied against the poppet valve and causes the poppet valve to move towards the inlet and disengage from the seal 90. This allows high pressure to pass from the inlet 24, through the heated regulator to the outlet 26 or regulated side of the device, thus raising the downstream pressure. When the downstream pressure rises to the set point, the poppet valve returns to its normal position and seals against the seal 90, thus stopping the flow of fluid from the inlet 24 to the outlet 26 or regulated side of the device.

FIG. 2 is a partial section view of the removable heat inducer 32 and heating chamber 28 of FIG. 1 rotated 90°. The body 22 forms the inlet 24. A concave cutout 202 is formed in the lower end 204 of the removable heat inducer 32 to straddle the heating tube 30 which penetrates the heating chamber 28.

FIG. 3 is an enlarged side view of the removable heat inducer 32 of FIG. 2. A concave cutout 202 in the lower end 204 of the heat inducer 32 is preferably sized and arranged to straddle and contact at least a portion of the heating tube 30, better seen in FIG. 1. However, the greater the contact the greater the heat transfer. A threaded receptacle 208, shown in phantom, may be positioned in the upper end 206 of the inducer 32 to make it easier to remove the inducer 32, should it become stuck in the heating chamber 28, better seen in FIG. 1. A convex depression 210 may be formed in the top 212 of the inducer 32. Helical threads 214 are formed on the outside surface 34 of the inducer 32. When the inducer 32 is heated, it expands and the crest 216 of the threads 214 come into contact with the inside surface 36 of the heating chamber 28, better seen in FIG. 1, to form a spiral passageway 218 from the lower end 204 to the upper end 206 of the inducer 32. The spiral passageway 218 provides a greater opportunity to heat the fluid as it passes from the inlet 24 to the regulated side 26 of the regulator 20. To improve the service life of the inducer 32, a hard anodized finish 220 may be applied to the outside surface 34. The inducer may be formed from aluminum or other material that readily conducts heat.

Figure 4:
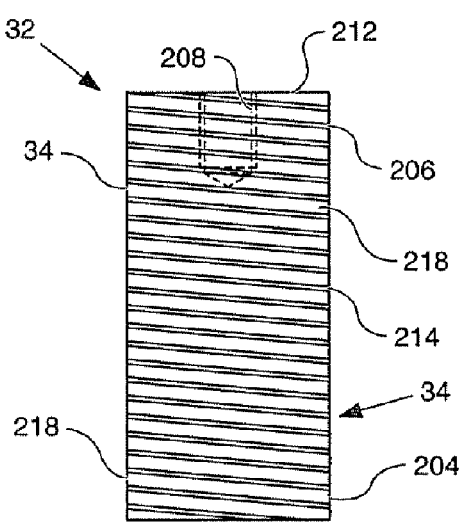
FIG. 4 is a side view of the removable heat inducer of FIG. 3 rotated 90°.

FIG. 4 is a side view of the removable heat inducer 32 of FIG. 3 rotated 90°. In other words, the inducer 32 in FIG. 4 is in the same orientation as the heat inducer 32 of FIG. 1. The heat inducer 32 of FIG. 3 is in the same orientation as the heat inducer 32 of FIG. 2. The helical threads 214 are formed in the outside surface 34 of the inducer to create the spiral passageway 218 when the crest 216 is in contact with the inside surface 36 of the heating chamber 28 of FIG. 1.

Figure 5:
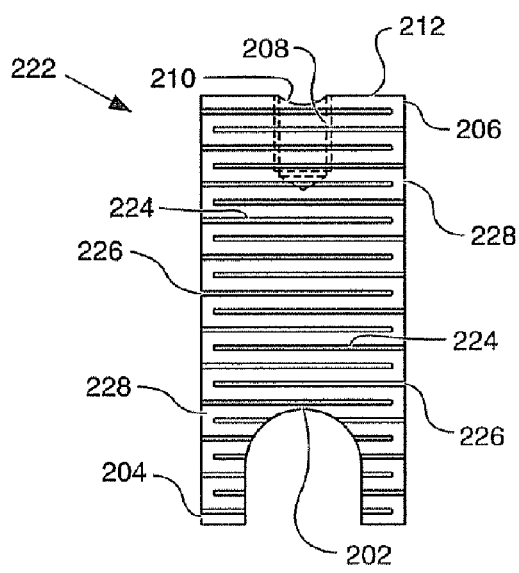
FIG. 5 is a side view of a first alternative embodiment of the heat inducer.

FIG. 5 is a side view of a first alternative embodiment of the heat inducer 222. In this alternative embodiment, the outside surface 34 is formed into a plurality of interconnecting dead head partitions 224. When this alternative embodiment of the inducer 222 is heated, the outside edges 226 of the dead head partitions 224 come into contact the inside surface 36 of the heating chamber 28 to form a dead head passageway 228 which directs fluid from the lower end 204 to the upper end 206 of the inducer 222. The convex depression 210 is formed in the top 212 of the inducer 222 to facilitate movement of the fluid from the deadhead passageway 228 to the regulator mechanism 70.

Figure 6:
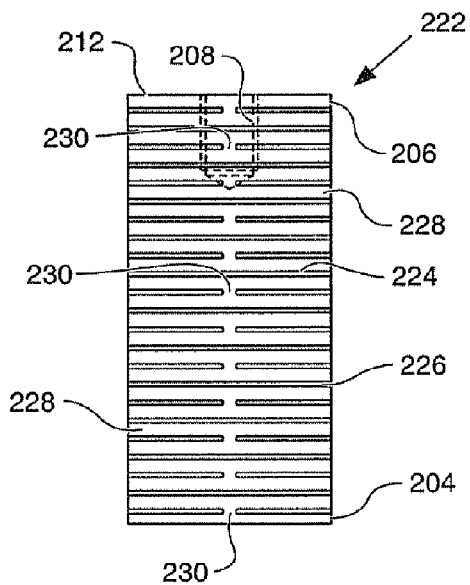
FIG. 6 is a side view of the removable heat inducer of FIG. 5 rotated 90°.

FIG. 6 is a side view of the first alternative embodiment of the removable heat inducer 222 of FIG. 5 rotated 90°. In FIG. 6, a plurality of slots 230 are formed in the dead head partitions 224. These slots 230 allow the fluid to move from the lower end 204 to the upper end 206 of the dead head passageway 228 formed between the outside edges 226 of the dead head partitions 224 and the inside surface 36 of the heating chamber 28 when the inducer 222 is heated.

Figure 7:
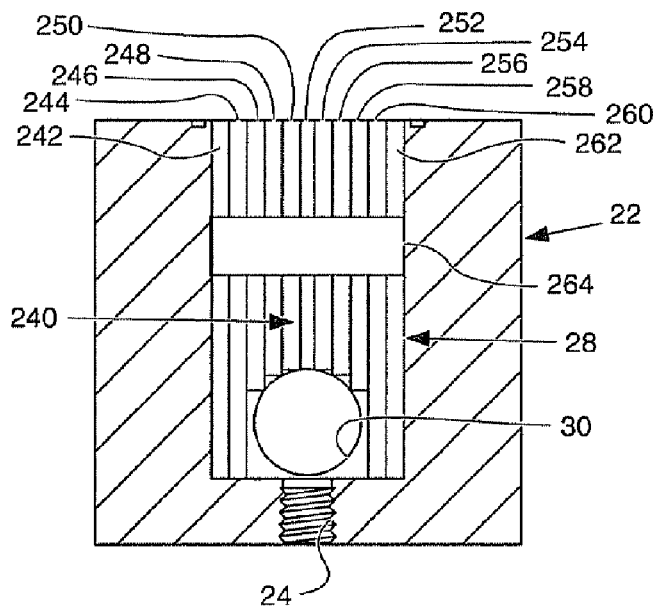
FIG. 7 is a section view of the heating chamber of FIG. 2 with a second alternative embodiment of the heat inducer.

FIG. 7 is a section view of the heating chamber of FIG. 2 with a second alternative embodiment of the heat inducer 240 which is formed from a plurality of rods 242-262. These rods may be separate from one another or they may be co-joined by an outside band 264 or other joining means. Some of the rods 246-258 are in contact with the heating tube 30. In this Figure, the rods are shown with a flat bottom, but they may also be formed with a concave bottom to increase the amount of contact and heat transfer between the inducer 240 and the heating tube 30.

Figure 8:
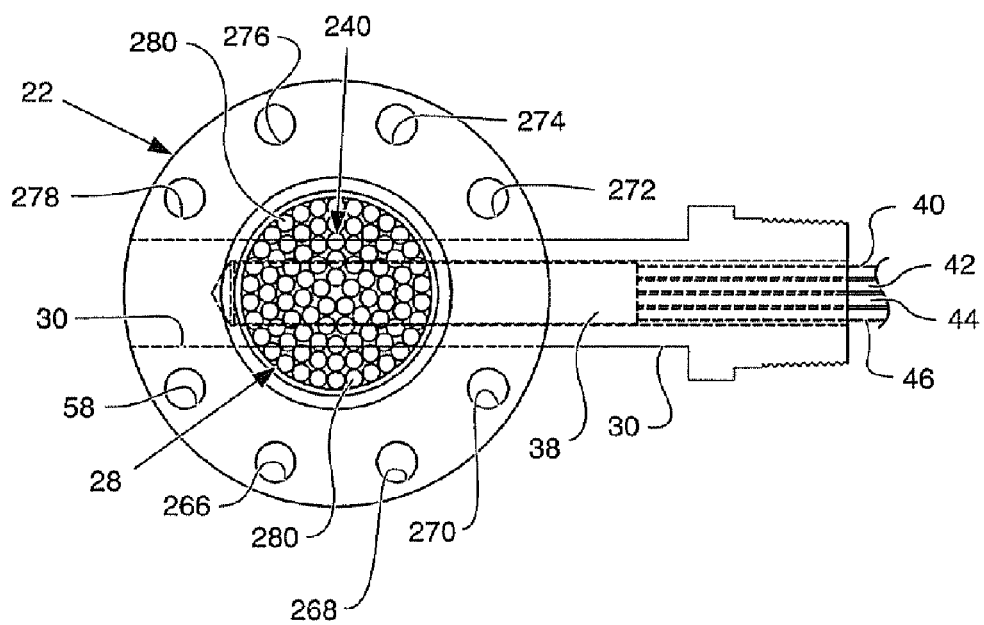
FIG. 8 is a top plan view of the heating chamber, heating tube, heating element and the second alternative embodiment of the heat inducer of FIG. 7.

FIG. 8 is a top plan view of the heating chamber 28, heating tube 30, heating element 38 and the second alternative embodiment of the heat inducer 240 of FIG. 7. Portions of the heating tube 30 penetrate the heating chamber 28 and those portions are therefore shown in phantom. The entire heating element 38 is surrounded by the heating tube 30; therefore, the entire heating element is shown in phantom. Like the other embodiments described above, fluid enters the inlet 24 and passes into the heating chamber 28 where it passes through the spaces 280 between the rods 242-262 of the heat inducer 240. In this Figure, the rods are circular in cross-section; however, they may have any cross-sectional profile, provided that spaces are formed for the fluid to flow between the rods. The heat inducer is heated by the heating element 38 and the heating tube 30. Apertures 266-278 are formed in the body 22 to receive bolts, not shown, like bolt 54 in FIG. 1. These bolts, not shown, hold the body segments together as shown in FIG. 1.

Figure 9:
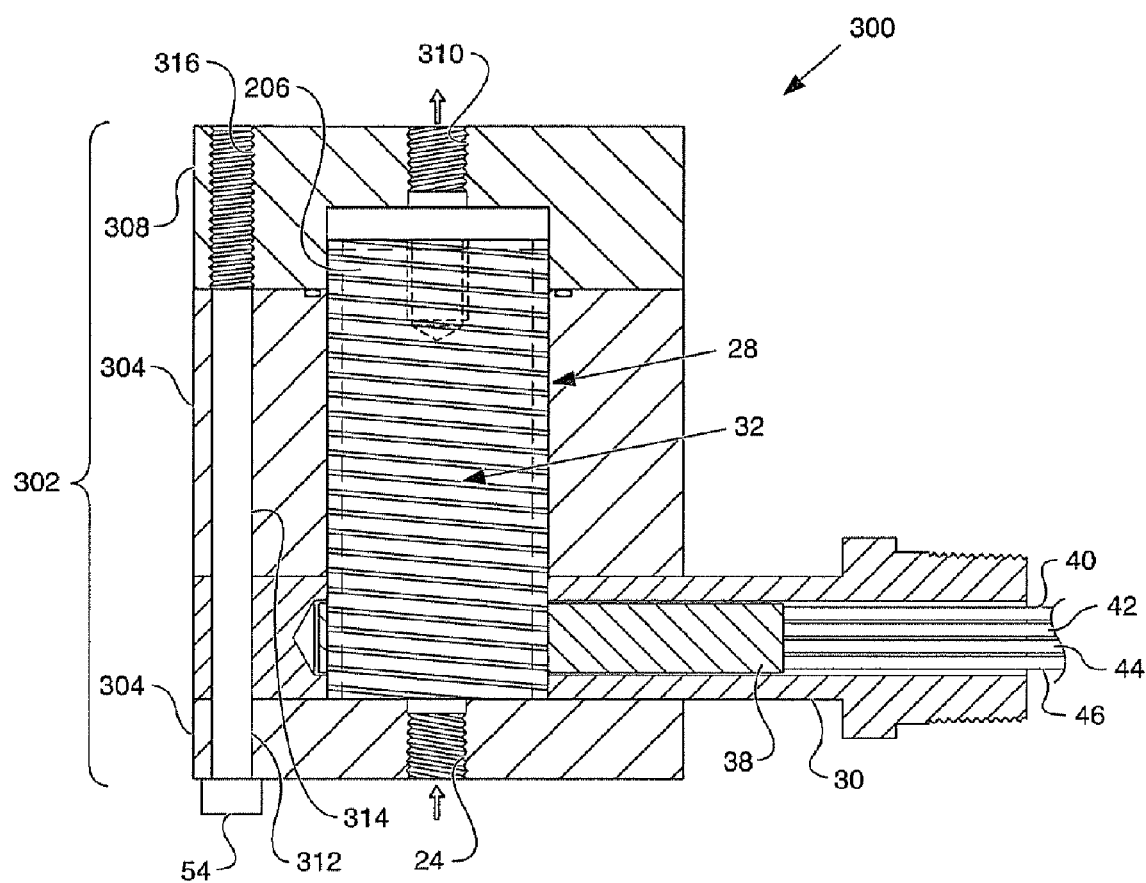
FIG. 9 is a section view of a fluid heater which can use the heat inducer of FIGS. 1-6.

FIG. 9 is a section view of a fluid heater 300 which can use the heat inducer 32, 222 or 240 of FIGS. 1-8. Components of FIG. 9 that are the same as FIG. 1 will use the same identification numerals. For example the inlet 24 of FIG. 1 is the same as the inlet 24 of FIG. 9. Components that are different will be given different identification numerals. For example, a body 302 includes a lower segment 304 and an upper segment 308. The bolt 54 passes through aperture 312 in the lower body segment and threadably engages a receptacle 316 in the upper body segment. The bolt 54, and others not shown, hold the two body segments together. Like the regulator of FIG. 1, the heater 300 of this Figure, has a heating tube 30 which passes through the middle body segment into the heating chamber 28. A removable heating element 38 is inserted inside the heating tube to heat the tube and the inducer 32. As shown in this Figure, the heater 300 holds the removable heat inducer 32 with a spiral passageway. The heater 300 may also use the removable heat inducer 222 with the dead head passageway or the removable heat inducer 240 with rods.

The fluid heater 300 has an outlet 310 formed in the upper body segment 308. Fluid enters the heating chamber 28 through the inlet 24 and circulates through the spiral passageway 218. As the fluid moves to the top 212 of the removable inducer 32 it leaves the fluid heater 300 through the outlet 310. The fluid heater 300 is essentially the same as the apparatus of FIG. 1, except the regulator mechanism 70 has been replaced with the upper body segment 308 having the outlet 310.

What is claimed is:

1. A heated fluid regulator comprising:
   a body having an inlet, an outlet and a heating chamber proximate the inlet;
   a heating tube, at least a portion of which is positioned in the heating chamber;
   a removable heat inducer sized and arranged to fit inside the heating chamber and contacting at least a portion of the heating tube;
   an electric heating element located inside the heating tube to heat the heating tube, the heat inducer and the fluid as it flows through the heating chamber; and
   wherein the removable heat inducer comprises a plurality of rods in the heating chamber, at least some of which are in contact with the heat tube.

2. The apparatus of claim 1 wherein a clearance between an outside diameter of the heat inducer and an inside diameter of the heating chamber is small enough to allow the outside diameter of the heat inducer to expand into contact with the inside diameter of the heating chamber when the heating element is on.

3. A heated fluid regulator comprising:
   a body having an inlet, an outlet, a regulator mechanism between the inlet and the outlet and a heating chamber;
   a heating tube penetrating the body and positioned in the heating chamber;
   a removable heat inducer sized and arranged to fit inside the heating chamber and straddle at least a portion of the heating tube;
   an electric heating element located inside the heating tube to heat the heating tube and the heat inducer and the fluid as it flows through the heating chamber;
   the heat inducer having sufficient clearance with the heating chamber when the regulator is cold to be removed from the heating chamber and expanding into contact with the heating chamber when the regulator is heated; and
   wherein the removable heat inducer has an irregular passageway formed on at least a portion of an exterior surface of the heat inducer with an opening to allow the heat inducer to straddle at least a portion of the heat tube.

4. A heated fluid regulator comprising:
   a body having an inlet, an outlet, a regulator mechanism between the inlet and the outlet and a heating chamber;
   a heating tube penetrating the body and positioned in the heating chamber;
   a removable heat inducer sized and arranged to fit inside the heating chamber and straddle at least a portion of the heating tube;
   an electric heating element located inside the heating tube to heat the heating tube and the heat inducer and the fluid as it flows through the heating chamber;
   the heat inducer having sufficient clearance with the heating chamber when the regulator is cold to be removed from the heating chamber and expanding into contact with the heating chamber when the regulator is heated; and
   wherein the removable heat inducer is formed from a plurality of rods.

5. A fluid heater comprising:
   a body defining a heating chamber having an inlet and an outlet;
   a heating tube, at least a portion of which is positioned in the heating chamber;
   a removable heat inducer sized and arranged to fit into the heating chamber and contact at least a portion of the heating tube;
   an electric heating element, a portion of which is positioned inside the heating tube to heat the tube, the heat inducer and the fluid as it passes through the; and
   wherein the removable heat inducer is formed from a plurality of rods.

* * * * *